No. 839,239. PATENTED DEC. 25, 1906.
C. E. WAGNER.
VEGETABLE SLICER.
APPLICATION FILED JAN. 19, 1906.

Witnesses.
L. A. St. John
F. J. Kubicek

Inventor
Charles E. Wagner
By Justin M. St. John
Atty.

UNITED STATES PATENT OFFICE.

CHARLES E. WAGNER, OF CEDAR RAPIDS, IOWA.

VEGETABLE-SLICER.

No. 839,239.　　　Specification of Letters Patent.　　　Patented Dec. 25, 1906.

Application filed January 19, 1906. Serial No. 296,904.

*To all whom it may concern:*

Be it known that I, CHARLES E. WAGNER, a citizen of the United States, residing at Cedar Rapids, in the county of Linn and State of Iowa, have invented certain new and useful Improvements in Vegetable-Slicers, of which the following is a specification.

The object of this invention is to provide a simple machine by which vetegables, fruit, and other articles of food may be sliced uniformly and rapidly.

The nature of the invention will clearly appear from the description and claim following, reference being had to the accompanying drawings, in which—

Figure 1:
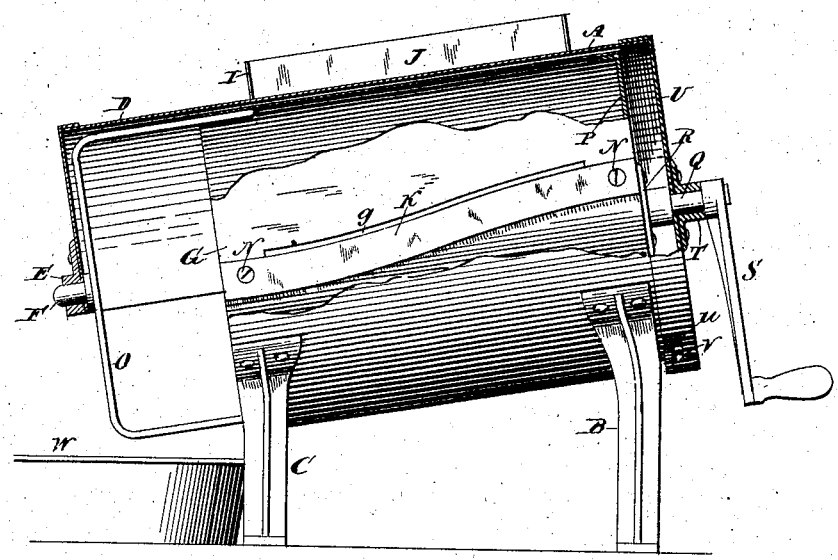
Figure 2:
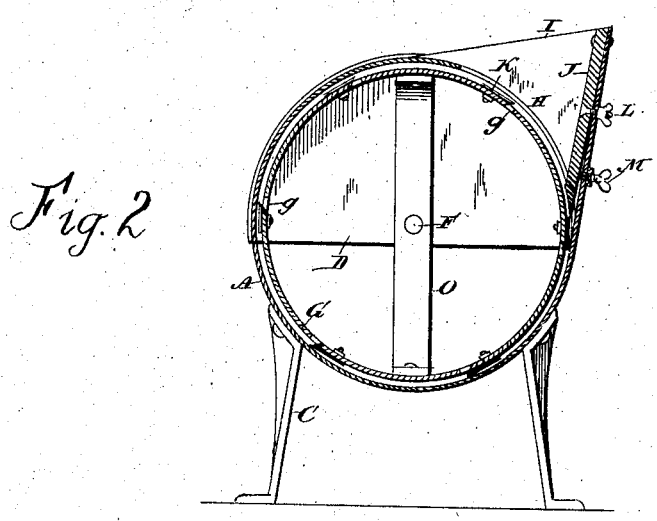

Figure 1 is a side elevation of a slicer embodying my invention, partly in section, to show the internal mechanism. Fig. 2 is a cross-section of the same in the line $a\ b$ looking toward the left.

In the drawings, A designates a cylindrical case, open at both ends and mounted on legs B and C, the legs C being shorter than the others, so as to incline the cylinder, as shown. The lower end of the cylinder is extended as to its upper half at D and is provided with a suitable bearing E to take the trunnion F of a cylinder G, mounted to revolve inside the outer casing. At one side the outer casing has an opening H, surrounded on three sides by a hopper I, which receives the vegetable or other article to be sliced. This hopper is preferably provided with a face-plate J, of hard wood, the lower end of which lies close to the path of the cutters K, attached to the inner cylinder. This face-plate is made nicely adjustable by means of set-screws L and M. The cutters are preferably inclined to the cylinder, as shown, and are suitably attached to the same, as by screws N. Near the cutting edge of each is an opening $g$ in the tubular cylinder, through which the slice passes as cut from the parent stock. To the lower end of the cylinder is attached a yoke O, provided with the trunnion F above referred to. The other end of the cylinder is closed by a head P, and to this is attached another trunnion Q, as by a flange R. This trunnion is provided with a crank S and turns in a bearing T, attached to the head U of the outer casing. For convenience in attachment and detachment the head is notched at $u$ to engage a stud V, there being preferably two of each and on opposite sides, though but one is shown in the drawings.

The operation of the slicer is very simple. The operator with one hand holds the material, or, to be more precise, presses it with one hand slightly as held in position in the hopper, and turns the crank with the other hand. The slices pass into the inside of the revolving cylinder and slide down to the open end and are caught in a suitable receptacle W. To clean, the working cylinder is quickly removed by turning the head U slightly and drawing it and the cylinder back endwise.

The curved form in which the slices are made is of decided advantage, as in the cooking of sliced apples, "Saratoga chips," and the like the slices lie up loosely in the cooking vessel instead of packing together flat and close, as straight-cut slices would do, and the result is that the sliced material is cooked more easily and uniformly than otherwise.

Having thus described my invention, what I claim as new, and desire to secure by Letters Patent, is—

In a vegetable-slicer, an inclined cylindrical casing having its upper portion at one end thereof provided with an extension forming a bearing, a hopper carried by the side walls of the casing and communicating with the interior thereof, a removable head for the upper end of the casing and provided with a bearing disposed in alinement with the bearing in the extension, a hollow inclined cylinder mounted for rotation within the casing and having its side walls provided with slots, cutters secured to the cylinder and provided with curved cutting edges disposed in said slots, a head at the upper end of the cylinder and having a central trunnion journaled in the adjacent bearing and provided with an operating-crank, and a yoke at the lower end of the cylinder and provided with a trunnion engaging the bearing in the extension of the casing.

In testimony whereof I affix my signature in presence of two witnesses.

CHARLES E. WAGNER.

Witnesses:
J. M. ST. JOHN,
F. J. KUBICEK.